United States Patent [19]

Georgeaux

[11] 4,297,183
[45] Oct. 27, 1981

[54] PROCESS FOR THE TREATMENT OF SOLUTIONS OF LEAD CHLORIDE

[75] Inventor: André Georgeaux, Rambouillet, France

[73] Assignee: Societe Miniere et Metallurgique de Penarroya, Paris, France

[21] Appl. No.: 177,434

[22] Filed: Aug. 12, 1980

[30] Foreign Application Priority Data

Aug. 24, 1979 [FR] France ............................... 79 21325

[51] Int. Cl.³ .............................................. C25L 1/18
[52] U.S. Cl. ................................ 204/117; 75/101 BE
[58] Field of Search .................... 75/101 BE; 204/117

[56] References Cited

U.S. PATENT DOCUMENTS 3,755,161  8/1973  Yokota et al. ..................... 210/36
4,063,933  12/1977  Peters ................................ 204/117
4,082,629  4/1978  Milner et al. ..................... 204/117
4,226,791  10/1980  Reinhardt et al. ............. 75/101 BE

*Primary Examiner*—R. L. Andrews
*Attorney, Agent, or Firm*—Fleit & Jacobson

[57] ABSTRACT

A process for the treatment of solutions of lead chloride, containing as impurities at least one metal chosen from the group consisting of silver, copper and bismuth. This process is characterized by the fact that it involves the following steps:
(a) bringing the solution into contact with a cation exchange resin whose active group is a sulfhydryl group; and
(b) recovery of the lead on the basis of the solution obtained in step (a).

13 Claims, No Drawings

PROCESS FOR THE TREATMENT OF SOLUTIONS OF LEAD CHLORIDE

The object of this invention is a process for the treatment of solutions of lead chloride containing as impurities at least one metal chosen from the group consisting of silver, copper and bismuth.

It involves more particularly a technique of elimination of the last traces of silver, copper and bismuth contained in solutions of lead chloride.

During the last five years, numerous methods have been proposed to recover the lead contained in different lead-bearing materials, such as oxidized and sulfurized minerals, as well as waste and residues of metallurgical treatment plants, methods which utilize the relatively high solubility of lead when it is in the form of chloride in a brine of alkaline or alkaline earth metals or of ammonium chloride.

Even when the mineral is very pure it contains in the impurity state other elements of which the most troublesome are silver, copper and bismuth. These metals, in the dissolution of lead, behave in general like the latter, are equally dissolved, and constitute impurities in the solution.

There exist numerous methods for eliminating impurities of lead chloride in solution. Among these methods can be mentioned cementation using metallic lead, sulfur precipitation using galena as presented in the French patent application No. 76-22.138, submitted by the applicant, and crystallization.

The former two do not make it possible to obtain solutions of lead chloride which are completely rid of silver, copper and bismuth. The efficiency of these methods being limited by the thermodynamic equilibria, it is not possible to increase it. Crystallization, on the other hand, makes it possible to obtain lead chloride of very high purity. However, this technique uses a great deal of energy since it involves a reduction of several tens of degrees centigrade of the lead chloride solution to precipitate the latter, the redissolution in a heated state of the lead chloride precipitated, and the reheating of the initial lead chloride solution. This is the reason why it is used with reluctance at the industrial level.

This is why one of the goals of the present invention is to provide a process of purification of lead chloride solutions which makes it possible to eliminate almost all the silver, copper and bismuth present in this solution, and notably to lower the ratios of silver/lead, copper/lead and bismuth/lead to a level below 10 ppm.

Another goal of the present invention is to furnish a process of the type above which does not consume a great deal of energy.

These goals, as well as others which will appear below, are attained by a process of the treatment of lead chloride solutions containing as impurities at least one metal chosen from the group consisting of silver, copper and bismuth, characterized by the fact that is involves the following steps:

(a) bringing the solution into contact with a cation exchange resin whose active group is a sulfhydryl group; and (b) recovery of the lead on the basis of the solution obtained in step (a).

The sulfhydry group (SH) may be eg: in the form of the following functional group:

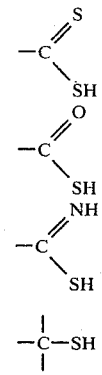

The two last ones being preferred.

The present invention gives particularly good results and is particularly well adapted to problems posed by lead chloride solutions whose composition is indicated in the following ranges, giving the usual range and the preferred range:

|  | Usual Range | Preferred Range |
| --- | --- | --- |
| Chloride ions (Cl$^-$) | 4 to 6 equivalent g/l | 4 to 5 equivalent g/l |
| Lead | 25 to 60 g/l | 30 to 40 g/l |
| Ferrous ions | 0 to 60 g/l | 0 to 60 g/l |
| Zinc | 0 to 30 g/l | 0 to 20 g/l |
| Silver | 0.1 to 200 mg/l | 0.1 to 100 mg/l |
| Copper | 0.2 to 2000 mg/l | 0.2 to 200 mg/l |
| Bismuth | 0.1 to 200 mg/l | 0.1 to 100 mg/l |
| pH | 0 to 5 | 1 to 4 |

The sulfhydryl (-SH) particularly thiol groups make possible by themselves the complete elimination of the silver and bismuth present in the solution, whereas the elimination of copper is subject to another parameter, which is the oxido reduction potential of the solution. If the elimination of copper must be total, the copper must, as completely as possible, be in the cuprous form. Furthermore, the -SH groups present the disadvantage of being sensitive to oxidation. The solutions resulting from oxidizing leaching of galenas are in particular liable to contain traces of Fe$^{+++}$ ions and bivalent copper. These two compounds, particularly the Fe$^{+++}$ ions, partially destroy the active group of the resin. For these reasons, it is appropriate before realizing the purification of step (a) to reduce the solution to bring the entirety of the copper to the cuprous form, the apparent oxide reduction potential being advantageously lower than or equal to 0, and preferably at $-520$ millivolts with regard to the saturated calomel electrode, this latter being in the same conditions as the solution.

The potential, however, must not be too reducing to prevent the precipitation of lead in the metal form from being too great.

Such a reduction can be effected by putting the lead chloride solution into contact with the galena, or preferably with the metallic lead. With this latter material, this technique presents the advantage of eliminating from the solution a large part of the silver, copper and bismuth in the form of cements, and therefore of being able to purify a larger quantity of solution per unit of volume of resin.

To obtain a still better result, one can bring the solution in the course of purification into contact with the metallic lead, in any manner, and thus maintain the solution's potential during the entire step (a) at a value, for example, between −520 and −560 millivolts in relation to the saturated calomel electrode at 60° C.

The reduction can be likewise effected by the electrolytic method.

The temperature of the solution during step (a) is preferably located between 60° C. and the boiling temperature.

For reasons of a practical nature, the pressure chosen is preferably atmospheric pressure. However, in certain cases pressures above or below atmospheric pressure can be used without altering the performance of the process.

The resins used in the course of step (a) can be, for example, resins sold under the commercial designation of IMACTI GT 73 by the Imacti Company and the resin sold under the commercial designation of LEWATIT OC 1014 by the Bayer Company. These two resins have as their active group the sulfhydryl group (-SH).

The solutions obtained after step (a) from the process according to the present invention have a silver, copper and bismuth content below the analytical detection limit; i.e., respectively below 0.1, 0.2 and 0.1 milligrams per liter.

Once the solution is purified, the lead can be recovered according to techniques already known, for example, by precipitating its salt, reducing it to the metallic state chemically or case-hardening it. However, one of the great advantages of purification according to the present invention is that it permits the direct acquisition of lead of high quality by electrolysis of the solution. Such electrolysis leads to the precipitation of lead whose purity can easily reach 99.95%, containing at the most 15 ppm of copper, 10 ppm of silver and 20 ppm of bismuth, the electrolysis having a tendency to raise the ratios between the impurites and the lead.

Resins saturated with silver, copper and/or bismuth can be reclaimed in the following manner:

(c) elution of the resin saturated with impurities by a solution of hydrochloric acid whose normality is between 5 and 12 N, preferably near 8 N.

When the active groups are altered by oxidation, they can be reclaimed by means of a solution of sodium sulfide.

The objective of the following nonrestrictive examples is to put specialists in a position to determine easily the operative conditions which are suitable for use in each particular case.

EXAMPLE 1

A solution is prepared which only contains chlorides of the following composition: NaCl 250 g/l; $Pb^{+2}$ 30 g/l; $Fe^{+2}$ 20 g/l; $Bi^{+3}$ 50 mg/l; $Ag^{+}$ 10 mg/l; and $Cu^{+}$ 10 mg/l.

This solution is brought to the temperature of 90° C. and continuously passed through two columns in series.

The first column contains lead turnings and effects a first purification by cementation of copper, silver and bismuth. Upon leaving this column, the solution contains less than 0.1 mg/l of bismuth and silver, but still 1 mg/l of copper.

The second column contains an ion exchange resin sold under the trademark of LEWATIT OC 1014 whereof active group is thiourea. Upon leaving this second column, the content of copper, silver and bismuth is below the analytical detection limit specified above, the mass ratio between these impurities and the lead being 7, 3 and 3 ppm, $(10-6)$ respectively. An output of 10 B.V./hr is achieved for 50 hours without observing an escape of copper in the solution.

It is, however, important that the solution not be reoxidized between the two columns. It has been observed that when air remains in the filter located between the two columns, the purification obtained by the resin is much worse. One can conclude from this that the resin fixes the cupric ion less well than the cuprous ion. The association of the cementation on the lead and of passage over resin containing -SH groups thus appears as an extremely efficient method for eliminating copper from a solution containing lead.

EXAMPLE 2

Purification

The solution resulting from corrosion effected according to the technique described in French patent application No. 76-22.138, published under the number 2,359,211, is treated in an installation including a storage tank for the solution resulting from the corrosion and a cementation reactor. This cylindrical reactor is composed of two superposed parts separated by an inclined partition in the form of a funnel. The impure corrosion solution is admitted into the lower compartment where the lead electrolytic powder is kept in suspension, causing the cementation of noble metals. The roughly purified solution is drawn off by an overflow system, in the upper part, not agitated, without an important carrying away of the solid. The two compartments of the reactor have a volume perceptibly equal to 0.85 liters.

The installation also includes a column temperature controlled at 90° C. furnished with ion exchange resin sold under the trademark IMACTI GT 73. The solution coming from the cementation reactor is introduced at the base of this column, after clarification.

The operational parameters of the purification are:

| | |
|---|---|
| Delivery output: | 0.85 liter/hour |
| Volume of each cementation reactor compartment: | 0.85 liter |
| Volume of resin in the column: | 0.085 liter |
| Volume of treated solution: | 30 liters |

The different phases produced during the purification operation correspond to the following chemical analysis:

| Element | Pb g/l | Cu mg/l | Ag mg/l |
|---|---|---|---|
| Initial solution | 30.0 | 60 | 0.9 |
| Solution after cementation | 30.0 | 0.8 | <0.1 |
| Solution passed through the resin | 30.0 | <0.2 | <0.1 |

The solution purified by the preceding step is then treated in an electrolysis installation. This installation includes:

a storage tank of purified solution; and an electrolysis cell.

The pure solution of $PbCl_2$ is pumped into the cathode compartment where it is rid of part of the lead which it contains before going through the diaphragm to penetrate the anode compartment. After oxidation of the ions of $Fe^{++}$ to $Fe^{+++}$, the anolyte is eliminated from the container. The lead formed is recovered, measured, then melted in the presence of soda at 400° C.

The ingot obtained corresponds to the following chemical analysis:

| Element | Cu ppm | Ag ppm | Bi ppm | As ppm | Sb ppm | Zn ppm |
|---|---|---|---|---|---|---|
| Ingot | 8 | <5 | <5 | 20 | <20 | 2 |

The quality of the product obtained is remarkable. Only a very small copper contamination is observed.

EXAMPLE 3

The implementation of a complete process including:
the selective corrosion of lead in a mixed concentrate of PbS, ZnS, and $CuFeS_2$;
rough purification of the corrosion solution by cementation with lead powder;
fine purification with ion exchange resin; and
production of ultra pure electrolytic lead by electrolysis of the solution purified.

The treated product is a mixed concentrate of PbS-ZnS-$CuFeS_2$, obtained by total flotation of solid pyrites of Aljustrel (Portugal). This product undergoes the following successive operations:

(a) Selective dissolution of the lead. In a one liter reactor, a concentrate and mixed solution of $FeCl_2$-$FeCl_3$ are introduced jointly and continuously in a medium of NaCl. The respective flows of solution and solid are chosen such that the ferric chloride is introduced in an amount slightly below stoichiometry in relation to the amount of galena present in the concentrate.

The operative parameters with regard to this operation are the following:

| | |
|---|---|
| Flow | 1.19 l/h |
| Concentrate flow | 627 g/h |
| Temperature | 90° C. |
| Concentration NaCl solution | 250 g/l |
| Concentration $Fe^{+++}$ initial solution | 9.54 g/l |
| Concentration $Fe^{++}$ initial solution | 7.8 g/l |
| Concentration $Pb^{++}$ initial solution | 10 g/l |
| Stoichiometry PbS/$FeCl_3$ | 1.04 Q.S. (stoichiometric quantity) |
| (Reaction $2FeCl_3 + 1PbS = PbCl_2 + 2FeCl_2 + S°$) | |
| Duration of the action | 9 hrs., 30 mins. |

The entering and exiting phases corresponding to this experiment correspond to the following chemical analysis:

| Element | Pb% g/l | Zn% g/l | Cu% g/l | Fe total % g/l | $Fe^{+++}$ g/l | Ag% g/l | S% |
|---|---|---|---|---|---|---|---|
| Initial concentrate | 3.2 | 9.5 | 2.5 | 33.0 | | 0.007 | 43.9 |
| Initial solution | 10 | 0 | 0 | 17.3 | 9.54 | 0 | |
| Washed corrosion residue | 0.27 | 10.1 | 2.68 | 36.0 | | 0.006 | 48.0 |
| Solution resulting from the corrosion | 25.2 | 2.02 | 0.038 | 18.5 | 0.02 | 0.007 | |

This leaching has made it possible to dissolve the principal elements in the following proportions:
Lead: 92%
Zinc: 2.7%
Copper: 0.3%
Iron: 0.2%
Silver: 20%

It is established that the dissolution of lead has been very selective relative to the other elements, due to a ratio PbS/$Fe^{+++}$ comprised between 1.0 and 1.50 time the stoichiometrical ratio.

(b) Purification of the lead solution. This operation has been effected in the equipment described in Example 2, including a two compartment cementation reactor and an ion exchange resin column.

The operative parameters concerning the purification in two steps are the following:

| | |
|---|---|
| Delivery rate: | 0.85 l/hr |
| Cementation reactor volume | |
| turbulent part: | 0.85 l |
| calm part: | 0.85 l |
| Resin bed volume: | 0.085 l |

During the purification, the eliminated impurities are distributed in the following manner:

| Phase Involved | % Distribution | | |
|---|---|---|---|
| | Copper | Silver | Bismuth |
| Cement | 92 | 91 | 58 |
| Resin | 8 | 9 | 42 |

(c) Electrolysis of the solution after the resin. This operation has been effected in the installation and the conditions described in Example 2. The solution leaving the resin column is sent directly to the electrolysis bath. The operations of purification and electrolysis are in effect conducted jointly.

The lead collected after the electrolysis is washed, then melted at 400° C. in the presence of soda. The resulting ingot has the following chemical analysis:

| Element | Cu | Ag | Bi | Sb | As | Zn | Sn |
|---|---|---|---|---|---|---|---|
| Concentration (ppm) | <10 | <10 | <10 | <100 | 40 | <10 | <100 |

This example illustrates perfectly the possibility of producing high purity metallic lead from any impure compound containing galena.

EXAMPLE 4

Elution of IMACTI GT 73 resin with hydrochloric acid.

A series of experiments is conducted with columns maintained at 90° C. by circulation of hot water in a double envelope.

Each experiment is effected in two cycles:

(1) The resin is first saturated using a synthetic solution of copper chloride in sodium chloride, titrating about 5 g/l of copper. The resin thus saturated contains, according to experiments, from 60 to 80 g/l of copper per liter.

(2) Each of the resin portions is then rinsed in water to eliminate the impregnating solution. The elution operation is then performed, with aqueous solutions of hydrochloric acid of different normalities depending on the resin batch.

The elution solution is collected by fraction from a bed volume which will be designated as B.V. (Bed Volume), and a determination of the copper concentration is conducted for each fraction. It is thus possible to determine the proportion of copper eluted, as a function of the amount of elution solution collected, and depending on the various hydrochloric acidities.

| Cumulative Number of Bed Volumes Collected | Cumulative Percentage of Copper Collected | | | |
|---|---|---|---|---|
| | Elution by HCl 3.95 N | Elution by HCl 5.8 N | Elution by HCl 6.8 N | Elution by NCl 7.6 N |
| 1 | 2.1 | 3.1% | 13.0 | 17.7 |
| 2 | 16.4 | 30.6% | 54.9 | 70.0 |
| 3 | 27.0 | 50.6% | 75.6 | 93.8 |
| 4 | 35.0 | 65.5% | 88.4 | 98.7 |
| 5 | 41.4 | 77.2% | 95.5 | |
| 6 | 46.9 | 85.9% | 97.0 | |
| 7 | 51.44 | 92.2% | | |
| 8 | 55.40 | 95.4% | | |
| 9 | 58.90 | 96.1% | | |
| 10 | 62.10 | 96.2% | | |
| 20 | 81.90 | | | |

The resin according to the invention may be shipped by alcaline metals cyanides too.

These results show that it is difficult to elute resin with hydrochloric acid of a normality less than or equal to 4. On the other hand, an acidity of around 4 to 6 N makes it possible to recover the copper with a good yield, on the condition of using large volumes of solution. An acidity above 6 N would seem to be preferable.

What is claimed is:

1. A process for the treatment of solutions of lead chloride containing as impurities at least one metal selected from the group consisting of silver, copper and bismuth, comprising the following steps:
    (a) contacting the solution with a cation exchange resin whose active group is a sulfhydryl group to separate impurities from the solution by absorption on the resin; and
    (b) recovering the lead from the solution after the solution has contacted the resin in step (a).

2. The process according to claim 1, wherein all the copper is reduced to the state of Cu+ before step (a).

3. The process according to claim 1, wherein the oxido reduction potential of the solution before its contact with the resin has a value less than or equal to 0 relative to the saturated calomel electrode.

4. The process according to claims 1, 2 or 3, wherein the oxido reduction potential is maintained during the entire duration of step (a) at a value between −520 and −560 millivolts to the saturated calomel electrode.

5. The process according to claims 1, 2 or 3, wherein the temperature of the solution is maintained during step (a) at a value between 60° C. and the boiling temperature.

6. The process according to claim 4, wherein the temperature of the solution is maintained during step (a) at a value between 60° C. and the boiling temperature.

7. The process according to claims 1, 2 or 3, wherein step (b) comprises subjecting the solution obtained in step (a) to electrolysis.

8. The process according to claim 4, wherein step (b) comprises subjecting the solution obtained in step (a) to electrolysis.

9. The process according to claim 5, wherein step (b) comprises subjecting the solution obtained in step (a) to electrolysis.

10. The process according to claims 1, 2 or 3, and further comprising the following step:
    (c) elution of the resin saturated with impurities by a hydrochloric acid solution of 5 to 12 N.

11. The process according to claim 4, and further comprising the following step:
    (c) elution of the resin saturated with impurities by a hydrochloric acid solution of 5 to 12 N.

12. The process according to claim 5, and further comprising the following step:
    (c) elution of the resin saturated with impurities by a hydrochloric acid solution of 5 to 12 N.

13. The process according to claim 7, and further comprising the following step:
    (c) elution of the resin saturated with impurities by a hydrochloric acid solution of 5 to 12 N.

* * * * *